United States Patent

[11] 3,578,910

[72] Inventor Robert E. Arko
Mount Prospect, Ill.
[21] Appl. No. 741,460
[22] Filed July 1, 1968
[45] Patented May 18, 1971
[73] Assignee Teletype Corporation
Skokie, Ill.

[54] SIGNAL RESPONSIVE FUNCTION PERFORMING MECHANISM
10 Claims, 2 Drawing Figs.

[52] U.S. Cl. .......... 178/23, 178/33
[51] Int. Cl. .......... H04l 15/26
[50] Field of Search .......... 178/33, 34, 27

[56] References Cited
UNITED STATES PATENTS

| | | | |
|---|---|---|---|
| 2,377,890 | 6/1945 | Lang .......... | 178/4 |
| 2,851,516 | 9/1958 | Doerrfeld et al. .......... | 178/33 |
| 2,965,716 | 12/1960 | Prince .......... | 178/33 |

*Primary Examiner*—William C. Cooper
*Assistant Examiner*—Jon Bradford Leaheey
*Attorneys*—T. L. Landis and R. P. Miller

ABSTRACT: A function mechanism for producing an output upon receipt of any signal except a designated signal comprising a universal function bar responsive to all signals, a universal function pawl responsive to the universal function bar, a coded function bar responsive to the designated signal and means responsive to the coded function bar for preventing the universal function pawl from responding to the universal function bar.

INVENTOR
ROBERT E. ARKO

BY Michael A. O'Neil
ATTORNEY

SIGNAL RESPONSIVE FUNCTION PERFORMING MECHANISM

BACKGROUND OF THE INVENTION

Telegraph receivers and other signal responsive devices have long been provided with function mechanisms which are devices that respond either to discrete signals or to patterns of discrete signals to produce an output. Heretofore most function mechanisms have been responsive only to rather limited ranges of inputs and have not been capable of producing outputs in response to all but certain specified inputs. Accordingly, a need exists for a function mechanism for producing an output in response to every received signal except a designated signal or group of signals.

SUMMARY OF THE INVENTION

In the preferred embodiment a function mechanism for performing the "all-but" function, i.e., for producing an output in response to every received signal except a designated signal or group of signals is comprised of a function mechanism for producing an output in response to all signals and a function mechanism responsive to the designated signal or group of signals for disabling the output.

DESCRIPTION OF THE DRAWING

A more complete understanding of the invention may be had by referring to the following Detailed Description when taken in conjunction with the drawing wherein.

DETAILED DESCRIPTION

Figure 1:
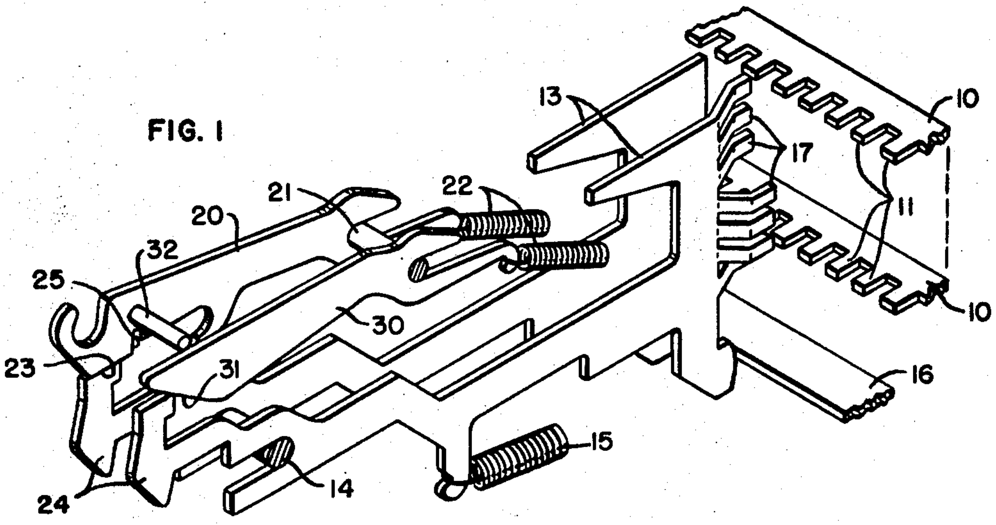
FIG. 1 is a perspective view of a portion of a function mechanism employing the present invention.

Referring now to the drawing wherein like reference numerals designate like parts throughout the several views and referring particularly to FIG. 1 thereof, there is shown a portion of the function mechanism of a signal responsive device such as a telegraph receiver, a data processing apparatus, etc. The function mechanism cooperates with a pair of code bars 10 having teeth 11 which pair of code bars comprise a portion of a plurality of code bars each individual to one bit of signals received by the signal responsive device. The code bars 10 are selectively positioned in accordance with received signals by a selector mechanism which may be of the type shown in U.S. Pat. No. 2,595,745 granted to W. J. Zenner on May 6, 1952 and accordingly each time a signal is received by the signal responsive device the teeth 11 of the code bars 10 are positioned in a pattern characteristic of and determined by the signal received.

Positioned adjacent the code bars 10 are a plurality of function bars 13 only two of which are shown. The function bars 13 are slidably mounted on a rod 14 and are urged to move toward the code bars 10 by a plurality of springs 15 (only one of which is shown) each individual to one of the function bars 13. Movement of the function bars 13 toward the code bars 10 is normally prevented by a release bar 16 which is rocked toward the code bar 10 and back to the position shown in the drawing once during each signal receiving cycle of the signal responsive device. The function bars 13 are typically provided with a plurality of tines 17 which are selectively formed to provide tines 17 in a pattern that matches the pattern of the teeth 11 of the code bars 10 when the device has received a particular signal. Therefore, if at the time the function bars 13 are permitted to move toward the code bars 10 by the release bar 16 the teeth 11 of the code bars 10 are arranged in a pattern different from the pattern of the tines 17 on a particular function bar 13, that particular function bar is blocked at a predetermined position by the engagement of the tines 17 of that function bar with the teeth 11 of the code bars 10. If, however, the pattern of the tines 17 of a particular code bar matches the pattern of the teeth 11 of the code bars 10, that particular function bar 13 is permitted to move further toward the code bars 10 then the remaining function bars 13 since its tines 17 do not engage any tooth 11 of any code bar 10.

Mounted above the function bars 13 are a plurality of function pawls 20 each individual to one of the function bars 13. The function pawls 20 are slidably supported on a rod 21 and are urged to move toward the code bars 10 by a plurality of function pawl springs 22 each individual to one of the function pawls 20. The function pawls 20 are typically provided with a surface 23 which rides on top of a finger 24 extending from a function bar 13. If, upon movement of the release bar 16 toward the code bars 10 the tines 17 of a function bar 13 corresponding to a particular function pawl 20 engage one or more of the teeth 11 of the code bars 10 the surface 23 remains on top of the finger 24 and the mechanism is restored to the condition shown in FIG. 1 upon the return of the release bar 16 to the position shown. If, however, the tines 17 of a function bar 13 corresponding to a particular function pawl 20 do not engage any tooth 11 of the code bars 10 upon movement of the release bar 16 toward the code bars 10 so that the particular function bar 13 moves farther toward the code bars 10 than the remaining function bars 13 the surface 23 falls off the finger 24 and a shoulder 25 of the pawl falls behind the finger 24 Then, upon return movement of the release bar 16 the function pawl 20 is driven to the left (FIG. 1) against the action of its respective spring 22 by the finger 24 of its respective function bar 13. The function pawls 20 are later returned to the condition shown in FIG. 1 by a stripper (not shown) which rocks the function pawls clockwise about the rod 21 so that the shoulders 25 of the function pawls 20 are clear of the fingers 24 whereupon the function pawls 20 are returned to the condition shown in the drawing by their respective springs 22.

Movement of the function pawls 20 with respect to the rod 21 away from the code bars 10 may be considered as the output of the function mechanism. This output may be used in any desired manner and is typically used to rock levers which in turn close or open contact pairs, control or drive various mechanical movements, etc. In addition, the movement of a particular function pawl may be used to condition an adjacent function bar 13 for response to a specific character thereby providing an output only upon the receipt of a predetermined sequence of characters.

In the mechanism shown in the drawing the left-hand or rearward function bar 13 is not provided with any tines 17 whatsoever and accordingly the left-hand function bar 13 moves to the extreme position with respect to the code bars 10 each time it is permitted to do so by the release bar 16 regardless of what signal is received by the device and, accordingly, regardless of the pattern the code bars 10 may be in at the time. Function bars of this type may be thought of as universal function bars which operate to provide an output by moving their respective universal function pawls to their actuated positions each time a signal is received by the device regardless of what that signal may be.

The right-hand or forward function bar 13, on the other hand, is not a universal function bar but is instead provided with tines 17 so that it moves to the extreme position with respect to the code bars 10 only upon receipt of a particular designated signal. The right-hand or forward function bar 13 is not provided with a typical function pawl but is instead provided with a camming function pawl 30 that is provided with a camming surface 31 rather than a surface 23 and which is not provided with any shoulder whatsoever. Accordingly, whenever the right-hand function bar 13 moves to the extreme position with respect to the code bars 10, that is, whenever a signal is received that positions the teeth 11 of the code bars 10 in a pattern corresponding to the pattern of the tines 17 on the right-hand function bar 13, the camming function pawl 30 is simply cammed upward by the cooperation of the finger 24 of the right-hand function bar 13 with the camming surface 31. Upon return of the release bar 16 to the position shown in the drawing the camming pawl 30 is simply returned to the condition shown in the drawing, that is, it is not moved away from the code bars 10.

Figure 2:
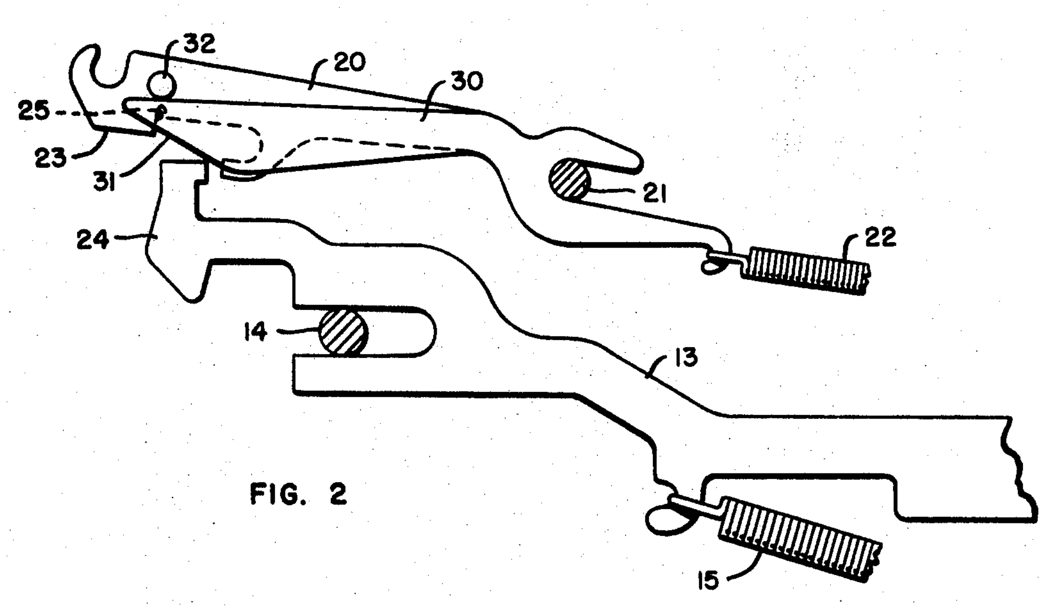
FIG. 2 is an enlarged, partial right side view of the portion of the function mechanism shown in FIG. 1.

The function pawl 20 of the left-hand or rearward function bar 13 is slightly modified with respect to typical function pawls in that it is provided with a pin 32 that extends over the camming pawl 30. Therefore, whenever the right-hand or forward function bar 13 moves farther toward the code bars 10 than the remaining function bars and the camming pawl 30 is thereupon moved upwardly by the interaction of the finger 24 of the right-hand function bar 13 and the surface 31, the camming pawl 30 engages the pin 32 and rocks the function pawl 20 of the left-hand function bar 13 upwardly so that the shoulder 25 of that function bar cannot fall behind the finger 24 of that function bar. This action is best shown in FIG. 2 wherein it will be clearly seen that the shoulder 25 has been raised significantly about the finger 24 by the action of the camming pawl 30. Raising of the pawl 20 prevents the left-hand function bar 13 from driving the function pawl 20 away from the code bars 10 upon the return of the release bar 16 to the position shown in the drawing even though the left-hand function bar 13 moves to the extreme position with respect to the code bars 10 upon receipt of the signal that allows the left-hand function bar 13 to move to the extreme position, which action occurs because the left-hand function bar 13 has a universal function bar 13. Return motion of the release bar 16 after movement of the right-hand function bar 13 to the extreme position simply restores the component parts of the mechanism to the condition shown in FIG. 1 thereby preventing the universal function bar from producing an output upon receipt of a designated signal, i.e., the signal that positions the teeth 11 of the code bars 10 in a pattern corresponding to the pattern of the tines 17 of the right-hand function bar 13.

The embodiment of the invention shown in the drawing may be modified in several significant respects. For example, the left-hand function bar 13 can be made responsive to each signal of a predetermined group of signals rather than to every signal received by the device at the right-hand function bar 13 can be coded to respond to a particular signal of the group. Also, the pin 32 can be made to extend over more than one camming pawl 30 and can be made to extend in both directions so that the left-hand function mechanism is prevented from producing an output in response to more than one designated character. And, movement of the left-hand function bar 13 can be made dependent on the receipt of a predetermined pattern or sequence of signals in the well known manner so that the output of the left-hand function mechanism is only prevented when the predetermined sequence of signals is received. Accordingly, although one embodiment of the invention is shown in the drawing and described in the foregoing specification it will be understood that the invention is not limited to the specific embodiment shown but is capable of modification, rearrangement and substitution of parts and elements without departing from the spirit of the invention.

I claim:

1. A function performing mechanism including:

means for receiving signals;

means responsive to all signals received by the signal receiving means for producing a predetermined response;

means responsive to the production of the predetermined response by the signal receipt responsive means for producing an output; and means responsive to receipt of at least one designated signal by the signal receiving means for inhibiting the output producing means from responding to the signal receipt responsive means thereby inhibiting production of the output during receipt of the one designated signal.

2. The function performing mechanism according to claim 1 wherein the signal receipt responsive means engages the output producing means upon receipt of a signal and wherein the means responsive to the designated signal prevents the signal receipt responsive means from engaging the output producing means upon receipt of the designated signal.

3. The function performing mechanism according to claim 2 wherein the means responsive to a designated signal engages the output producing means and drives the output producing means to a position wherein the signal receipt responsive means does not engage it.

4. In a signal responsive device of the type including a plurality of code bars positioned in responsive to received signals, a plurality of function bars each for sampling the positions of the code bars and each for movement to a selected position upon the receipt of at least one predetermined signal and a plurality of function pawls each individual to one of the function bars and each mounted for latching engagement with its respective function bar upon movement thereof to its selected position, wherein the improvement comprises:

one of the plurality of function bars being a universal function bar for movement to a selected position every time any signal in a predetermined group of signals is received;

another of the plurality of function bars being a function bar for movement to the selected position upon the receipt of a predetermined signal in the group; and means responsive to movement of the function bar responsive to the predetermined signal to its selected position for preventing latching engagement of the function pawl individual to the universal function with the universal function bar during response of the function bar responsive to the predetermined signal.

5. The signal responsive device according to claim 4 wherein the function bar responsive to the predetermined signal is positioned immediately next to the universal function bar and wherein the movement responsive means engages the function pawl of the universal function bar.

6. The signal responsive device according to claim 4 wherein the function bars normally drive their respective function pawls to output positions upon latching engagement therewith so that the means for preventing latching engagement of the function pawl individual to the universal function bar with the universal function bar prevents the universal function bar from driving the function pawl individual to the universal function bar to its output position.

7. In a function performing mechanism, the subcombination of:

a universal function bar coded to respond to every signal in a selected group of signals;

a universal function pawl responsive to the universal function bar for producing an output; and a disabling function mechanism encoded for response to at least a designated signal in the group for preventing the universal function pawl from responding to the universal function bar.

8. The subcombination according to claim 7 wherein the disabling function mechanism includes camming means for engaging the universal function pawl and thereby preventing it from responding to the universal function bar.

9. The subcombination according to claim 7 further includes means for normally latching the universal function bar to the universal function pawl and wherein the disabling function mechanism operates by preventing such latching.

10. The subcombination according to claim 9 wherein the disabling function mechanism includes a disabling function bar positioned adjacent the universal function bar and means driven by the disabling function bar for preventing latching engagement of the universal function bar with the universal function pawl.